(12) United States Patent
Raja et al.

(10) Patent No.: US 10,769,019 B2
(45) Date of Patent: Sep. 8, 2020

(54) SYSTEM AND METHOD FOR DATA RECOVERY IN A DISTRIBUTED DATA COMPUTING ENVIRONMENT IMPLEMENTING ACTIVE PERSISTENCE

(71) Applicant: Oracle International Corporation, Redwood Shores, CA (US)

(72) Inventors: Harvey Raja, Manchester (GB); Gene Gleyzer, Lexington, MA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 79 days.

(21) Appl. No.: 15/912,816

(22) Filed: Mar. 6, 2018

(65) Prior Publication Data

US 2019/0026185 A1   Jan. 24, 2019

Related U.S. Application Data

(60) Provisional application No. 62/534,531, filed on Jul. 19, 2017.

(51) Int. Cl.
*G06F 11/00* (2006.01)
*G06F 11/14* (2006.01)
(Continued)

(52) U.S. Cl.
CPC ........ *G06F 11/142* (2013.01); *G06F 11/1441* (2013.01); *G06F 11/1446* (2013.01);
(Continued)

(58) Field of Classification Search
CPC ............... G06F 11/142; G06F 11/1446; G06F 11/0709; G06F 11/1402; G06F 11/1425;
(Continued)

(56) References Cited

U.S. PATENT DOCUMENTS 5,784,569 A   7/1998   Miller
5,819,272 A   10/1998  Benson
(Continued)

FOREIGN PATENT DOCUMENTS

EP   0928089 A2   7/1999

OTHER PUBLICATIONS

Oracle®, Oracle® Database, JDBC Developer's Guide 12c Release 1 (12.1), Jun. 2014, Copyright© 1999, 2014, 520 pages.
(Continued)

*Primary Examiner* — Joseph D Manoskey
(74) *Attorney, Agent, or Firm* — Tucker Ellis LLP (57) ABSTRACT

A system and method for automatic recovery of actively persisted data in a distributed data grid. A dynamic active recovery quorum function determines the number of cluster storage members that must be available before recovery starts. The use of the dynamic active recovery quorum allows time for a cluster to start and ensures that partitions can be recovered gracefully without overloading too few storage members. The dynamic active recovery quorum function automatically configures the recovery quorum based on a predefined algorithm and data collected about cluster membership during cluster operation prior to the catastrophic failure or shut down for planned maintenance.

20 Claims, 4 Drawing Sheets

(51) Int. Cl.
  *G06F 11/20* (2006.01)
  *G06F 11/16* (2006.01)
(52) U.S. Cl.
  CPC ...... *G06F 11/1658* (2013.01); *G06F 11/2035* (2013.01); *G06F 11/2043* (2013.01); *G06F 11/2097* (2013.01); *G06F 2201/81* (2013.01); *G06F 2201/885* (2013.01)
(58) Field of Classification Search
  CPC ............. G06F 11/1448; G06F 11/1458; G06F 11/1471; G06F 11/1464; G06F 11/1469; G06F 2201/86; G06F 11/1441; G06F 11/1658; G06F 11/2035; G06F 11/2043; G06F 11/2097; G06F 2201/81; G06F 2201/885
  See application file for complete search history.

(56) References Cited

U.S. PATENT DOCUMENTS

| | | | |
|---|---|---|---|
| 5,933,818 A | 8/1999 | Kasravi | |
| 5,940,367 A | 8/1999 | Antonov | |
| 5,991,894 A | 11/1999 | Lee | |
| 5,999,712 A | 12/1999 | Moiin | |
| 6,078,930 A | 6/2000 | Lee | |
| 6,192,401 B1* | 2/2001 | Modiri | G06F 9/5061 370/254 |
| 6,453,426 B1 | 9/2002 | Gamache | |
| 6,487,622 B1 | 11/2002 | Coskrey | |
| 6,553,389 B1 | 4/2003 | Golding | |
| 6,605,120 B1 | 8/2003 | Fields | |
| 6,693,874 B1 | 2/2004 | Shaffer | |
| 6,871,222 B1 | 3/2005 | Frank | |
| 6,952,758 B2 | 10/2005 | Chron | |
| 7,020,695 B1 | 3/2006 | Kundu | |
| 7,139,925 B2 | 11/2006 | Dinker | |
| 7,260,698 B2 | 8/2007 | Hepkin | |
| 7,376,953 B2 | 5/2008 | Togasaki | |
| 7,451,359 B1 | 11/2008 | Coekaerts | |
| 7,464,378 B1 | 12/2008 | Lmaye | |
| 7,496,782 B1* | 2/2009 | Kownacki | H04L 67/1097 714/10 |
| 7,543,046 B1 | 6/2009 | Bae | |
| 7,613,774 B1 | 11/2009 | Caronni | |
| 7,640,339 B1 | 12/2009 | Caronni | |
| 7,698,390 B1 | 4/2010 | Harkness | |
| 7,720,971 B2 | 5/2010 | Moutafov | |
| 7,739,677 B1 | 9/2010 | Kekre | |
| 7,792,977 B1 | 9/2010 | Brower | |
| 7,814,248 B2 | 10/2010 | Fong | |
| 7,882,067 B2 | 2/2011 | Saika | |
| 7,953,861 B2 | 5/2011 | Yardley | |
| 7,975,288 B2 | 7/2011 | Viavant | |
| 7,979,457 B1 | 7/2011 | Garman | |
| 8,209,307 B2 | 6/2012 | Erofeev | |
| 8,312,439 B2 | 11/2012 | Kielstra | |
| 8,397,227 B2 | 3/2013 | Fan | |
| 8,402,464 B2 | 3/2013 | Dice | |
| 8,595,714 B1 | 11/2013 | Hamer | |
| 9,135,268 B2 | 9/2015 | Dash | |
| 9,274,902 B1* | 3/2016 | Morley | G06F 11/2002 |
| 9,609,060 B2 | 3/2017 | Kan | |
| 2002/0035559 A1 | 3/2002 | Crowe | |
| 2002/0042693 A1 | 4/2002 | Kampe | |
| 2002/0078312 A1 | 6/2002 | Wang-Knop | |
| 2003/0023680 A1* | 1/2003 | Shirriff | G06F 11/0709 709/204 |
| 2003/0120715 A1 | 6/2003 | Johnson | |
| 2003/0135476 A1 | 7/2003 | Holland | |
| 2003/0187927 A1 | 10/2003 | Winchell | |
| 2004/0059805 A1 | 3/2004 | Dinker | |
| 2004/0153558 A1 | 8/2004 | Gunduc | |
| 2004/0153615 A1 | 8/2004 | Koning | |
| 2004/0176968 A1 | 9/2004 | Syed | |
| 2004/0179471 A1 | 9/2004 | Mekkittikul | |
| 2004/0205148 A1 | 10/2004 | Bae | |
| 2004/0267897 A1 | 12/2004 | Hill | |
| 2005/0021690 A1 | 1/2005 | Peddada | |
| 2005/0021737 A1 | 1/2005 | Ellison | |
| 2005/0028139 A1 | 2/2005 | Togahara | |
| 2005/0083834 A1 | 4/2005 | Dunagan | |
| 2005/0160315 A1 | 7/2005 | Chandrasekaran | |
| 2005/0193392 A1 | 9/2005 | Carusi | |
| 2005/0257217 A1 | 11/2005 | Woollen | |
| 2006/0048020 A1 | 3/2006 | Newport | |
| 2006/0090095 A1* | 4/2006 | Massa | G06F 11/1479 714/4.11 |
| 2007/0016822 A1 | 1/2007 | Rao | |
| 2007/0118693 A1 | 5/2007 | Brannon | |
| 2007/0124348 A1 | 5/2007 | Claborn | |
| 2007/0140110 A1 | 6/2007 | Kaler | |
| 2007/0174160 A1 | 7/2007 | Solberg | |
| 2007/0198700 A1 | 8/2007 | Vivian | |
| 2007/0237072 A1 | 10/2007 | Scholl | |
| 2007/0271584 A1 | 11/2007 | Anderson | |
| 2008/0077622 A1 | 3/2008 | Keith | |
| 2008/0133531 A1 | 6/2008 | Baskerville | |
| 2008/0141336 A1 | 6/2008 | Haller | |
| 2008/0183876 A1 | 7/2008 | Duvur | |
| 2008/0184201 A1 | 7/2008 | Burns | |
| 2008/0276231 A1 | 11/2008 | Huang | |
| 2008/0281959 A1 | 11/2008 | Robertson | |
| 2008/0313293 A1 | 12/2008 | Jacobs | |
| 2009/0144714 A1 | 6/2009 | Fan | |
| 2009/0177914 A1 | 7/2009 | Winchell | |
| 2009/0228321 A1 | 9/2009 | Srinivasan | |
| 2009/0265449 A1 | 10/2009 | Krishnappa | |
| 2009/0320005 A1 | 12/2009 | Toub | |
| 2010/0064341 A1 | 3/2010 | Aldera | |
| 2010/0128732 A1 | 5/2010 | Jiang | |
| 2010/0174802 A1 | 7/2010 | Chan | |
| 2010/0250321 A1 | 9/2010 | Farrell | |
| 2010/0268571 A1 | 10/2010 | Davies | |
| 2010/0268749 A1 | 10/2010 | Seitz | |
| 2010/0312861 A1 | 12/2010 | Kolhi | |
| 2011/0041006 A1 | 2/2011 | Fowler | |
| 2011/0071981 A1 | 3/2011 | Ghosh | |
| 2011/0072217 A1 | 3/2011 | Hoang | |
| 2011/0107135 A1 | 5/2011 | Andrews | |
| 2011/0131663 A1 | 6/2011 | Kaikuranta | |
| 2011/0161289 A1 | 6/2011 | Pei | |
| 2011/0179231 A1 | 7/2011 | Roush | |
| 2011/0249552 A1 | 10/2011 | Stokes | |
| 2011/0252192 A1 | 10/2011 | Busch | |
| 2012/0117157 A1 | 5/2012 | Ristock | |
| 2012/0158650 A1 | 6/2012 | Andre | |
| 2012/0191642 A1 | 7/2012 | George | |
| 2012/0197822 A1* | 8/2012 | Lee | G06F 9/5061 706/10 |
| 2012/0198455 A1 | 8/2012 | Lee | |
| 2012/0215740 A1 | 8/2012 | Vaillant | |
| 2012/0254118 A1 | 10/2012 | Shah | |
| 2012/0297056 A1 | 11/2012 | Lee | |
| 2013/0047165 A1 | 2/2013 | Goetz | |
| 2014/0149698 A1 | 5/2014 | Ezra | |
| 2015/0058293 A1 | 2/2015 | Kobayashi | |
| 2015/0169718 A1* | 6/2015 | Lee | G06F 16/182 707/613 |
| 2017/0228285 A1* | 8/2017 | Merritt | G06F 11/1076 |

OTHER PUBLICATIONS

European Patent Office, International Searching Authority, International Search Report and Written Opinion dated Jan. 12, 2016 for International Application No. PCT/US2015/052060, 14 pages.

European Patent Office, Examining Division, Communication pursuant to Article 94(3) EPC dated Sep. 4, 2019 for European Patent Application No. 15781206.6, 8 pages.

Jameela Al-Jaroodi et al., "Middleware Infrastructure for Parallel and Distributed Programming Models in Hetergeneous Systems" (2003). CSE Journal Articles, 13 pages, retrieved Jan. 21, 2016

(56) References Cited

OTHER PUBLICATIONS from: <http://digitalcommons.unl.edu/cgi/viewcontent.cgi?article=1066&context=csearticles>.
Laurent Baduel et al., "Programming, Composing, Deploying for the Grid", Grid Computing: Software Environments and Tools, Springer, 30 pages, retrieved Jan. 21, 2016 from: <https://hal.inria.fr/inria-00486114/document>.
David Wong et al., "Java-based Mobile Agents", Communications of the ACM, Mar. 1999, vol. 42. No. 3, 11 pages.

\* cited by examiner

SYSTEM AND METHOD FOR DATA RECOVERY IN A DISTRIBUTED DATA COMPUTING ENVIRONMENT IMPLEMENTING ACTIVE PERSISTENCE

CLAIM OF PRIORITY

This application claims the benefit of priority to U.S. Provisional Application No. 62/534,531 filed Jul. 19, 2017 titled "SYSTEM AND METHOD FOR DATA RECOVERY IN A DISTRIBUTED DATA COMPUTING ENVIRONMENT IMPLEMENTING ACTIVE PERSISTENCE", which application is incorporating herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a distributed data grid.

SUMMARY

Described herein are systems and methods that can support automatic data recovery in a distributed data grid implementing active persistence. When using active persistence, cache contents are automatically persisted on all mutations such that the cache contents can be recovered on cluster/service startup. The cache contents can be persisted to local storage for speed or network-attached storage for enhanced availability.

Recovery from active persistence can be controlled using an active persistence recovery quorum policy which defines requirements for commencing recovery. Delaying commencement of recovery from active persistence until the requirements of the active persistence recovery quorum policy are satisfied allows time for a cluster and cluster members to initiate, and ensures that partitions can be recovered gracefully without overloading too few storage members.

Conventionally, a quorum policy relies on parameters predefined by an administrator of a cluster when configuring the cluster. Described herein is a system and method for use with active persistence which automatically configures the active persistence recovery quorum policy based on an algorithm and data collected about cluster membership during cluster operation. Thus, the description below described the implementation of a dynamic active persistence recovery quorum policy which is automatically configured/modified in response to changes in cluster membership during operation of the cluster without requiring intervention by the cluster administrator.

These and other objects and advantages of the present invention will become apparent to those skilled in the art from the following description of the various embodiments, when read in light of the accompanying drawings.

DETAILED DESCRIPTION

Described herein are systems and methods that can support automatic data recovery in a distributed data grid implementing active persistence. When using active persistence, cache contents are automatically persisted on all mutations such that the cache contents can be recovered on cluster/service startup. The cache contents can be persisted to local storage for speed or network-attached storage for enhanced availability.

Recovery from active persistence can be controlled using an active persistence recovery quorum policy which defines requirements for commencing recovery. Delaying commencement of recovery from active persistence until the requirements of the active persistence recovery quorum policy are satisfied allows time for a cluster and cluster members to initiate, and ensures that partitions can be recovered gracefully without overloading too few storage members.

Conventionally, a quorum policy relies on parameters predefined by an administrator of a cluster when configuring the cluster. Described herein is a system and method for use with active persistence which automatically configures the active persistence recovery quorum policy based on an algorithm and data collected about cluster membership during cluster operation. Thus, the description below described the implementation of a dynamic active persistence recovery quorum policy which is automatically configured/modified in response to changes in cluster membership during operation of the cluster without requiring intervention by the cluster administrator.

Active persistence and the dynamic active persistence recovery quorum policy is implemented, for example, in a distributed computing environment such as the distributed data grid of FIG. 1, below. Active persistence and the dynamic active persistence recovery quorum policy may find useful in other distributed computing environments in which a partitioned or otherwise distributed persistence store is utilized and a graceful recovery from such store is necessary or desirable.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. And functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Distributed Data Grid

A distributed computing environment includes a collection of computer servers work together in one or more clusters to manage information and related operations, such as computations, within a distributed or clustered environment. A distributed data grid is an example of a distributed computing environment. A distributed data grid can be used to manage application objects and data that are shared across the servers. A distributed data grid provides low response time, high throughput, predictable scalability, continuous availability and information reliability. As a result of these capabilities, a distributed data grid is well suited for use in computational intensive, stateful middle-tier applications. In particular examples, distributed data grids, such as e.g., the Oracle® Coherence data grid, store information in-memory to achieve higher performance, and employ redundancy in keeping copies of that information synchronized across multiple servers, thus ensuring resiliency of the system and continued availability of the data in the event of failure of a server.

In the following description, an Oracle® Coherence data grid having a partitioned cache is described. However, one of ordinary skill in the art will understand that the present invention, described for example in the summary above, can be applied to any distributed data grid known in the art without departing from the scope of the invention. Moreover, although numerous specific details of an Oracle® Coherence distributed data grid are described to provide a thorough description of the invention, it will be apparent to those skilled in the art that the invention may be practiced in a distributed data grid without these specific details. Thus, a particular implementation of a distributed data grid embodying the present invention can, in some embodiments, exclude certain features, and/or include different, or modified features than those of the distributed data grid described below, without departing from the scope of the invention.

Figure 1:
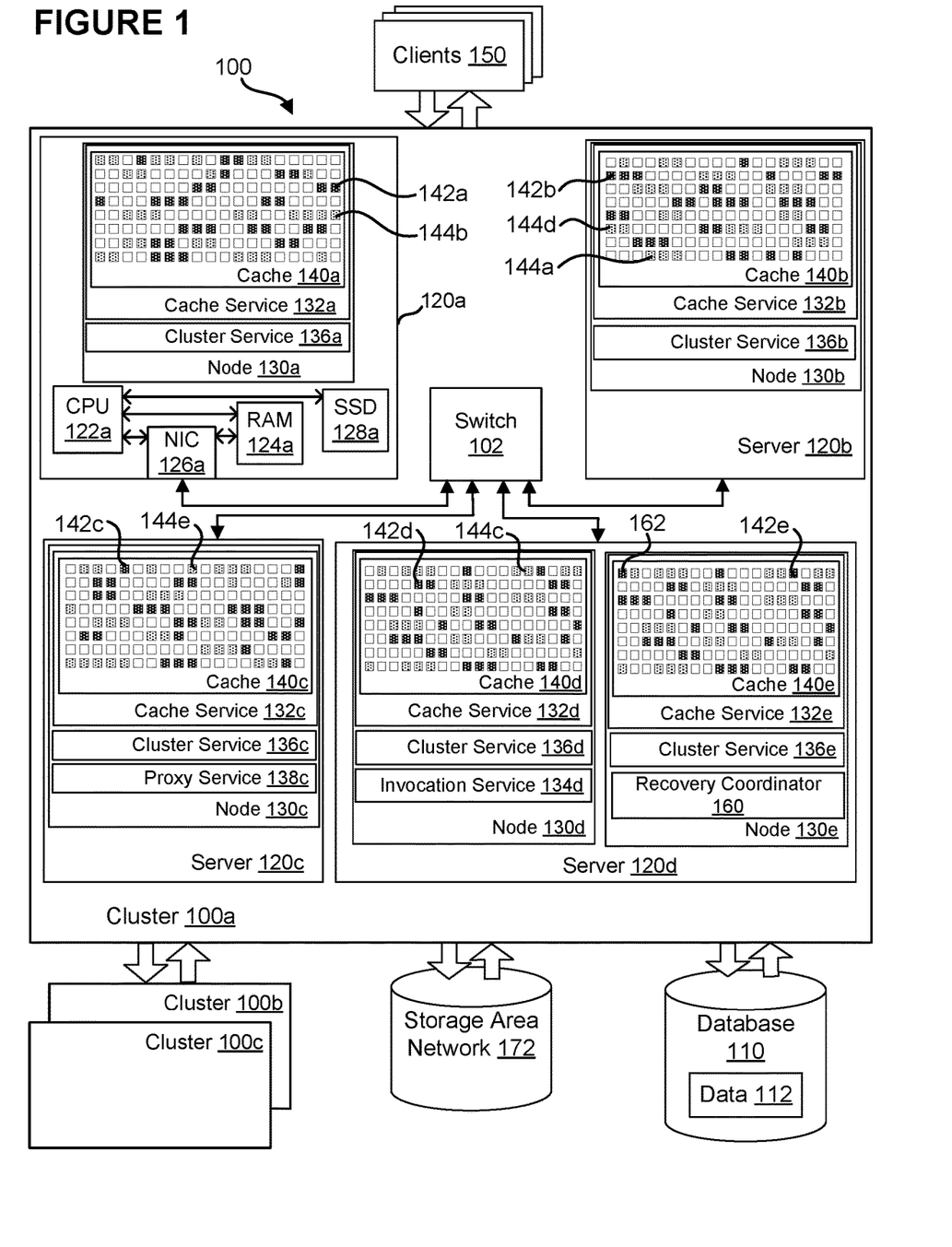
FIG. 1 illustrates a distributed data grid, in accordance with an embodiment of the invention.

FIG. 1 illustrates and example of a distributed data grid 100 which stores data and provides data access to clients 150. A "data grid cluster", or "distributed data grid", is a system comprising a plurality of computer servers (e.g., 120a, 120b, 120c, and 120d) which work together in one or more cluster (e.g., 100a, 100b, 100c) to store and manage information and related operations, such as computations, within a distributed or clustered environment. While distributed data grid 100 is illustrated as comprising four servers 120a, 120b, 120c, 120d, with five data nodes 130a, 130b, 130c, 130d, and 130e in a cluster 100a, the distributed data grid 100 may comprise any number of clusters and any number of servers and/or nodes in each cluster. The distributed data grid can store the information in-memory to achieve higher performance, and employ redundancy in keeping copies of that information synchronized across multiple servers, thus ensuring resiliency of the system and continued availability of the data in the event of server failure. In an embodiment, the distributed data grid 100 implements the present invention, described for example in the summary above and the detailed description below.

As illustrated in FIG. 1, a distributed data grid provides data storage and management capabilities by distributing data over a number of servers (e.g., 120a, 120b, 120c, and 120d) working together. Each server of the data grid cluster may be a conventional computer system such as, for example, a "commodity x86" server hardware platform with one to two processor sockets and two to four CPU cores per processor socket. Each server (e.g., 120a, 120b, 120c, and 120d) is configured with one or more CPU, Network Interface Card (NIC), and memory including, for example, a minimum of 4 GB of RAM up to 64 GB of RAM or more. Server 120a is illustrated as having CPU 122a, Memory 124a and NIC 126a (these elements are also present but not shown in the other Servers 120b, 120c, 120d). Optionally each server may also be provided with flash memory—e.g. SSD 128a—to provide spillover storage capacity. When provided the SSD capacity is preferably ten times the size of the RAM. The servers (e.g., 120a, 120b, 120c, 120d) in a data grid cluster 100a are connected using high bandwidth NICs (e.g., PCI-X or PCIe) to a high-performance network switch 120 (for example, gigabit Ethernet or better).

A cluster 100a preferably contains a minimum of four physical servers to avoid the possibility of data loss during a failure, but a typical installation has many more servers Failover and failback are more efficient the more servers that are present in each cluster and the impact of a server failure on a cluster is lessened. To minimize communication time between servers, each data grid cluster is ideally confined to a single switch 102 which provides single hop communication between servers. A cluster may thus be limited by the number of ports on the switch 102. A typical cluster will therefore include between 4 and 96 physical servers.

In most Wide Area Network (WAN) configurations of a distributed data grid 100, each data center in the WAN has independent, but interconnected, data grid clusters (e.g., 100a, 100b, and 100c). A WAN may, for example, include many more clusters than shown in FIG. 1. Additionally, by using interconnected but independent clusters (e.g., 100a, 100b, 100c) and/or locating interconnected, but independent, clusters in data centers that are remote from one another, the distributed data grid can secure data and service to clients 150 against simultaneous loss of all servers in one cluster caused by a natural disaster, fire, flooding, extended power loss and the like. Clusters maintained throughout the enterprise and across geographies constitute an automatic 'backup store' and high availability service for enterprise data.

One or more nodes (e.g., 130a, 130b, 130c, 130d and 130e) operate on each server (e.g., 120a, 120b, 120c, 120d) of a cluster 100a. In a distributed data grid the nodes may be for example, software applications, virtual machines, or the like and the servers may comprise an operating system, hypervisor or the like (not shown) on which the node operates. In an Oracle® Coherence data grid, each node is Java virtual machine (JVM). A number of JVM/nodes may be provided on each server depending on the CPU processing power and memory available on the server. JVM/nodes may be added, started, stopped, and deleted as required by the distributed data grid. JVMs that run Oracle® Coherence automatically join and cluster when started. JVM/nodes that join a cluster are called cluster members or cluster nodes.

In an Oracle® Coherence data grid cluster members communicate using Tangosol Cluster Management Protocol (TCMP). TCMP is an IP-based protocol that is used to discover cluster members, manage the cluster, provision services, and transmit data between cluster members. The TCMP protocol provides fully reliable, in-order delivery of all messages. Since the underlying UDP/IP protocol does not provide for either reliable or in-order delivery, TCMP uses a queued, fully asynchronous ACK and NACK-based mechanism for reliable delivery of messages, with unique integral identity for guaranteed ordering of messages in queues associated with the JVMs operating on a server. The TCMP protocol requires only three UDP/IP sockets (one multicast, two unicast) and six threads per JVM/node, regardless of the cluster size.

The functionality of a data grid cluster is based on services provided by cluster nodes. Each service provided by a cluster node has a specific function. Each cluster node can participate in (be a member of) a number of cluster services, both in terms of providing and consuming the cluster services. Some cluster services are provided by all nodes in the cluster whereas other services are provided by only one or only some of the nodes in a cluster. Each service has a service name that uniquely identifies the service within the data grid cluster, and a service type, which defines what the service can do. There may be multiple named instances of each service type provided by nodes in the data grid cluster (other than the root cluster service). All services preferably provide failover and failback without any data loss.

Each service instance provided by a cluster node typically uses one service thread to provide the specific functionality of the service. For example, a distributed cache service provided by a node is provided by single service thread of the node. When the schema definition for the distributed cache is parsed in the JVM/node, a service thread is instantiated with the name specified in the schema. This service thread manages the data in the cache created using the schema definition. Some services optionally support a thread pool of worker threads that can be configured to provide the service thread with additional processing resources. The service thread cooperates with the worker threads in the thread pool to provide the specific functionality of the service.

In an Oracle® Coherence data grid, the cluster service (e.g., 136a, 136b, 136c, 136d, 136e) keeps track of the membership and services in the cluster. Each cluster node always has exactly one service of this type running. The cluster service is automatically started to enable a cluster node to join the cluster. The cluster service is responsible for the detection of other cluster nodes, for detecting the failure (death) of a cluster node, and for registering the availability of other services in the cluster. The proxy service (e.g., 138c) allows connections (e.g. using TCP) from clients that run outside the cluster. The invocation Service (e.g., 134d) allows application code to invoke agents to perform operations on any node in the cluster, or any group of nodes, or across the entire cluster. Although shown on only one node each, the invocation service and proxy service can be configured on any number up to all of the nodes of the distributed data grid. Agents allows for execution of code/functions on nodes of the distributed data grid (typically the same node as data required for execution of the function is required). Distributed execution of code, such as agents, on the nodes of the cluster allows the distributed data grid to operate as a distributed computing environment.

In an Oracle® Coherence data grid, the distributed cache service (e.g., 132a, 132b, 132c, 132d, 132e) is the service which provides for data storage in the distributed data grid and is operative on all nodes of the cluster that read/write/store cache data, even if the node is storage disabled. The distributed cache service allows cluster nodes to distribute (partition) data across the cluster 100a so that each piece of data in the cache is managed primarily (held) by only one cluster node. The distributed cache service handles storage operation requests such as put, get, etc. The distributed cache service manages distributed caches (e.g., 140a, 140b, 140c, 140d, 140e) defined in a distributed schema definition and partitioned among the nodes of a cluster.

A partition is the basic unit of managed data in the distributed data grid and stored in the distributed caches (e.g., 140a, 140b, 140c, 140d, and 140e). The data is logically divided into primary partitions (e.g., 142a, 142b, 142c, 142d, and 142e), that are distributed across multiple cluster nodes such that exactly one node in the cluster is responsible for each piece of data in the cache. Each cache (e.g., 140a, 140b, 140c, 140d, and 140e) can hold a number of partitions. Each partition (e.g., 142a, 142b, 142c, 142d, 142e) may hold one datum or it may hold many. A partition can be migrated from the cache of one node to the cache of another node when necessary or desirable. For example, when nodes are added to the cluster, the partitions are migrated so that they are distributed among the available nodes including newly added nodes. In a non-replicated distributed data grid there is only one active copy of each partition (the primary partition). However, there is typically also one or more replica/backup copy of each partition (stored on a different server) which is used for failover. Because the data is spread out in partition distributed among the servers of the cluster, the responsibility for managing and providing access to the data is automatically load-balanced across the cluster.

The distributed cache service can be configured so that each piece of data is backed up by one or more other cluster nodes to support failover without any data loss. For example, as shown in FIG. 1, each partition is stored in a primary partition (e.g., dark shaded squares 142a, 142b, 142c, 142d, and 142e) and one or more synchronized backup copy of the partition (e.g., light shaded squares 144a, 144b, 144c, 144d, and 144e). The backup copy of each partition is stored on a separate server/node than the primary partition with which it is synchronized. Failover of a distributed cache service on a node involves promoting the backup copy of the partition to be the primary partition. When a server/node fails, all remaining cluster nodes determine what backup partitions they hold for primary partitions on failed node. The cluster nodes then promote the backup partitions to primary partitions on whatever cluster node they are held (new backup partitions are then created).

A distributed cache is a collection of data objects. Each data object/datum can be, for example, the equivalent of a row of a database table. Each datum is associated with a unique key which identifies the datum. Each partition (e.g., 142a, 142b, 142c, 142d, 142e) may hold one datum or it may hold many and the partitions are distributed among all the nodes of the cluster. In an Oracle® Coherence data grid each key and each datum is stored as a data object serialized in an efficient uncompressed binary encoding called Portable Object Format (POF).

In order to find a particular datum, each node has a map, for example a hash map, which maps keys to partitions. The map is known to all nodes in the cluster and is synchronized and updated across all nodes of the cluster. Each partition has a backing map which maps each key associated with the partition to the corresponding datum stored in the partition. An operation associated with a particular key/datum can be received from a client at any node in the distributed data grid. When the node receives the operation, the node can provide direct access to the value/object associated with the key, if the key is associated with a primary partition on the receiving node. If the key is not associated with a primary partition on the receiving node, the node can direct the operation directly to the node holding the primary partition associated with the key (in one hop). Thus, using the hash map and the partition maps, each node can provide direct or one-hop access to every datum corresponding to every key in the distributed cache.

In some applications, data in the distributed cache is initially populated from a database 110 comprising data 112. The data 112 in database 110 is serialized, partitioned and distributed among the nodes of the distributed data grid. Distributed data grid 100 stores data objects created from data 112 from database 110 in partitions in the memory of servers 120a, 120b, 120c, 120d such that clients 150 and/or applications in data grid 100 can access those data objects directly from memory. Reading from and writing to the data objects in the distributed data grid 100 is much faster and allows more simultaneous connections than could be achieved using the database 110 directly. In-memory replication of data and guaranteed data consistency make the distributed data grid suitable for managing transactions in memory until they are persisted to an external data source such as database 110 for archiving and reporting. If changes are made to the data objects in memory the changes are synchronized between primary and backup partitions and may subsequently be written back to database 110 using asynchronous writes (write behind) to avoid bottlenecks.

Although the data is spread out across cluster nodes, a client 150 can connect to any cluster node and retrieve any datum. This is called location transparency, which means that the developer does not have to code based on the topology of the cache. In some embodiments, a client might connect to a particular service e.g., a proxy service on a particular node. In other embodiments, a connection pool or load balancer may be used to direct a client to a particular node and ensure that client connections are distributed over some or all the data nodes. However connected, a receiving node in the distributed data grid receives tasks from a client 150, and each task is associated with a particular datum, and must therefore be handled by a particular node. Whichever node receives a task (e.g. a call directed to the cache service) for a particular datum identifies the partition in which the datum is stored and the node responsible for that partition, the receiving node, then directs the task to the node holding the requested partition for example by making a remote cache call. Since each piece of data is managed by only one cluster node, an access over the network is only a "single hop" operation. This type of access is extremely scalable, since it can use point-to-point communication and thus take optimal advantage of a switched fabric network such as InfiniBand.

Similarly, a cache update operation can use the same single-hop point-to-point approach with the data being sent both to the node with the primary partition and the node with the backup copy of the partition. Modifications to the cache are not considered complete until all backups have acknowledged receipt, which guarantees that data consistency is maintained, and that no data is lost if a cluster node were to unexpectedly fail during a write operation. The distributed cache service also allows certain cluster nodes to be configured to store data, and others to be configured to not store data.

In some embodiments, a distributed data grid is optionally configured with an elastic data feature which makes use of solid state devices (e.g. SSD 128a), most typically flash drives, to provide spillover capacity for a cache. Using the elastic data feature a cache is specified to use a backing map based on a RAM or DISK journal. Journals provide a mechanism for storing object state changes. Each datum/value is recorded with reference to a specific key and in-memory trees are used to store a pointer to the datum (a tiny datum/value may be stored directly in the tree). This allows some values (data) to be stored in solid state devices (e.g. SSD 128a) while having the index/memory tree stored in memory (e.g. RAM 124a). The elastic data feature allows the distributed data grid to support larger amounts of data per node with little loss in performance compared to completely RAM-based solutions.

A distributed data grid such as the Oracle® Coherence data grid described above can improve system performance by solving data operation latency problems and by caching and processing data in real time. Applications cache data in the data grid, avoiding expensive requests to back-end data sources. The shared data cache provides a single, consistent view of cached data. Reading from the cache is faster than querying back-end data sources and scales naturally with the application tier. In memory performance alleviates bottlenecks and reduces data contention, improving application responsiveness. Parallel query and computation is supported to improve performance for data-based calculations. The distributed data grid is fault-tolerant, providing for data reliability, accuracy, consistency, high availability, and disaster recovery. The distributed data grid enables applications to scale linearly and dynamically for predictable cost and improved resource utilization. For many applications, a distributed data grid offers a valuable shared data source solution.

In embodiments of the present invention, the distributed data grid 100 of FIG. 1 implements one or more system and method for active persistence of the data within the caches 140a, 140b, 140c, 140d, and 140e. Active persistence features of the distributed data grid manage the persistence and recovery of distributed caches. Cached data is persisted so that it can be quickly recovered after a catastrophic failure or after a cluster restart due to planned maintenance. Using the active persistence function, cache contents are automatically persisted on all mutations such that the cache contents can be recovered on cluster/service startup. To put it another way, each transaction that mutates data in the cache includes an operation to persist the mutated data to an active persistence store.

The persisted data can be can be stored on the local disk (e.g. SSD 128a of each server or on a shared disk on a storage area network (SAN) 162. Local disk storage provides a high throughput, high speed, and low latency storage mechanism and is preferred for active persistence. The shared disk option allows increased availability of the persisted data. However, a shared disk or network storage increases communication overhead for the cluster member performing the persistence and increases latency it is accordingly not preferred for active persistence. A shared disk or network storage may be preferred for other types of recovery information such as, for example, snapshots or snapshot archives After a catastrophic failure or after a cluster restart due to planned maintenance the data persisted by the active persistence function can be recovered from e.g. the local disks of the computer systems making up the cluster and used to populate the partitions in the cluster without loss of data. Distributed data grid 100 utilizes a dynamic active persistence recovery quorum function which determines the number of cluster storage members that must be available before recovery starts. The use of the dynamic active recovery quorum allows time for a cluster and for sufficient storage members to start to ensure that partitions can be recovered gracefully without overloading too few storage members. What computer systems are required for the recovery and how many storage members are required on each computer system depends on properties of the cluster which change as data is written to, or removed from the cluster. The dynamic active persistence recovery quorum is automatically configured based on a predefined algorithm and data collected about cluster membership during cluster operation prior to the catastrophic failure or shut down for planned maintenance. Accordingly the dynamic active persistence recovery quorum is responsive to the properties of the cluster which change as data is written to, or removed from, the cluster Active Persistence Caches can be automatically persisted to disk and automatically recovered when a cluster is restarted. Using the active persistence function, cache contents are automatically persisted on all mutations such that the cache contents can be recovered on cluster/service startup. The mutated data is persisted on the local disk (e.g. SSD 128a of each server) as an integral part of each transaction which mutates data in the cache. Local disk storage provides a high throughput, high speed, and low latency storage mechanism.

In a particular embodiment the mutated data is persisted using Oracle Berkeley DB (Java Edition). Berkeley DB is a family of embedded key-value database libraries providing scalable high-performance data management services to applications. The Berkeley DB products use simple function-call APIs for data access and management. When used as part of active persistence in the distributed data grid the simple function-call API of Berkeley DB is used to write key-value data to the database on each mutation of key-value cache data. The database is stored in the local storage of each node (for example SSD 128a of computer system 120a). Thus, a mutation transaction includes a write operation to the key-value cache data (such as cache 140a of node 130a) as well as a call to the Berkeley DB API which is used to write the mutated data to the database data on for example SSD 128a of computer system 120a.

During operation of the distributed data grid the cache service on each cluster member provides access to the data stored in the partitions stored in-memory in the cache of the cluster member. The cache service thread receives requests from clients and/or other nodes in the distributed data grid. The cache service thread utilizes a scalable pool of worker threads to perform tasks in response to the requests. Certain requests, e.g. read requests, do not change the data stored in the partition. Other requests, e.g. write requests, change/mutate the cache contents.

When implementing the active persistence function, the service thread dispatches two tasks for each mutating task. One task performs the mutation of the in-memory datum, the other task persists the mutated datum to the active persistence store on disk (either local or SAN). The persistence of the mutated datum to disk is performed using synchronous I/O and thus does not complete until a response (success/fail/timeout) is received. Response is not made to the cache service until both tasks are completed. If persistence failures occur during active persistence operations, the default response is to immediately stop the cache service. This behavior is ideal if persistence is critical for the service (for example, a cache depends on persistence for data backup). However, if persistence is not critical, the administrator can chose to configure the service to continue servicing requests in the event of an active persistence failure.

Figure 2:
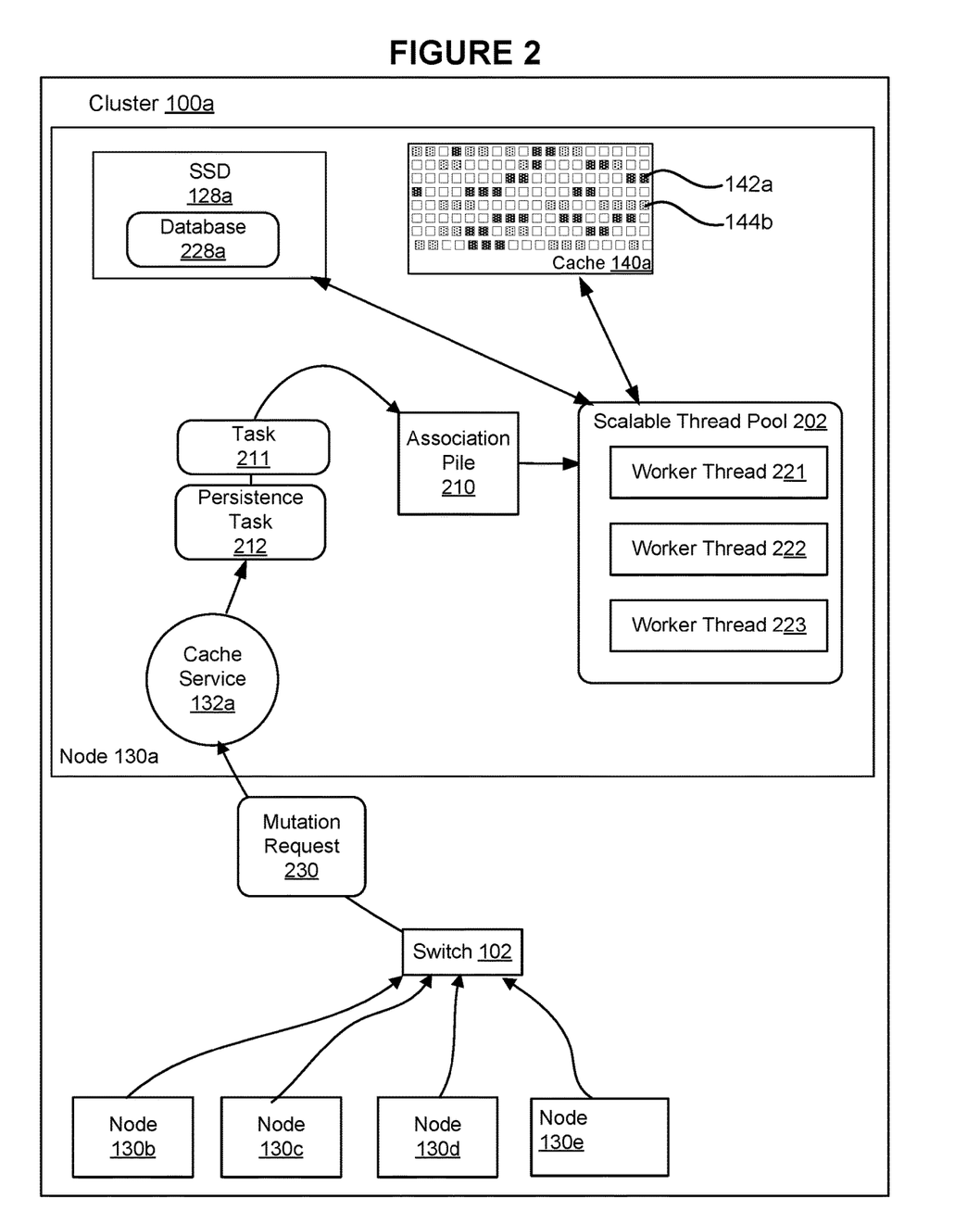
FIG. 2 illustrates active persistence in a distributed data grid.

FIG. 2 shows an overview of a scalable thread pool system suitable for use in active persistence in a distributed data grid. Additional features of the scalable thread pool are described in U.S. patent application Ser. No. 14/857,458 entitled SYSTEM AND METHOD FOR SUPPORTING A SCALABLE THREAD POOL IN A DISTRIBUTED DATA GRID FILED Sep. 17, 2015 which is hereby incorporated by reference. The scalable thread pool system can be configured to implement active persistence functionality. As shown in FIG. 2, a cache service thread 132a operating on a node 130a in the cluster 100a of the distributed data grid can receive requests from any of the other nodes in the cluster (e.g. nodes 130b, 130c, 130d, and 130e).

The cache service thread 132a processes messages, including mutation request 230 in the order in which they are received by the cache service thread 132a. Mutation request 230 might, for example a write request against a datum in partition in 142a. In response to each mutation request the cache service generates a task 211 to perform the mutation on cache 140a and also an active persistence task 212 which records the mutated data in the database 228a of SSD 128a.

Tasks 211 and 212 are added to the association pile 210 for execution. The scalable thread pool 202 contains one or typically more worker threads 221-223. The system allows multiple threads (e.g. the worker threads 321-323) to poll elements from the association pile 210 in parallel. Additionally, the system prevents an element, which is held in the association pile 210 and has an association with a previously polled element, from being polled until the previously polled associated element has been released. Persistent tasks directed to the same partition (e.g. tasks 211 and 212 resulting from mutation request 132a and directed at partition 142a) have the same association. Thus, the system can prevent a persistent task in the association pile keyed to a particular partition from being processed while another persistent task keyed to the same partition is being executed by a worker thread. Accordingly tasks 211 and 212 have the same association and are processed on a single thread. One task performs the mutation of the in-memory datum, the other task persists the mutated datum to the active persistence store on disk (either local or SAN). The persistence of the mutated datum to disk is performed using synchronous I/O and thus does not complete until a response (success/fail/timeout) is received. Response is not made to the cache service 132a until both tasks 211 and 212 are completed. If persistence failures occur during active persistence operations, the default response is to immediately stop the cache service 132a.

As described above, caches can be automatically persisted to disk. Using the active persistence function, cache contents are automatically persisted on all mutations such that the cache contents can be recovered on cluster/service startup.

Quorum Policy

The partitioned cache quorum policy defines quorums for the partitioned cache service (DistributedCache). Each quorum mandates how many service members are required before different partitioned cache service operations can be performed. These quorums are typically used to indicate at what service member levels different service operations are best performed given the intended use and requirements of a distributed cache. Quorums are a means to define some threshold that prevents actions/decisions being made prior to the threshold being met. In distributed systems this tends to be used to define a minimum number of required participants prior to agreeing an outcome. These thresholds are generally constants defined upfront during by an administrator prior to starting the system. To put it another way, these quorums are usually static in that they do not change without administrator intervention and are typically not changed during operation of the cluster A recovery quorum mandates the minimum number of storage-enabled members of a partitioned cache service that must be present to recover partitions from persistent storage, or assign empty partitions if the persistent storage is unavailable or lost. The Recover Quorum supports a value of zero. A value of zero enables the dynamic active persistence recovery policy, which ensures availability of all persisted state and is based on the last good cluster membership information to determine how many members must be present for the recovery. During recovery, recovery of persisted partitions is not commenced until the selected recovery quorum or dynamic active persistence recovery quorum is satisfied.

The recovery quorum is used to define the number of cluster storage members that must be available before persistence recovery starts. The use of a recovery quorum allows time for a cluster to start and ensures that partitions of the active persistence store can be recovered gracefully without overloading too few storage members or without inadvertently deleting orphaned partitions.

If the recovery quorum is not satisfied, then persistence recovery from the recovery does not proceed and the service or cluster may appear to be blocked. To check for this scenario, an administrator can view the QuorumPolicy attribute in the ServiceMBean MBean to see if recover is included in the list of actions. If data has not been recovered after cluster startup, the following log message is emitted (each time a new service member starts up) to indicate that the quorum has not been satisfied:
<Warning> (thread=DistributedCache:DistributedCachePersistence, member=1): Action recover disallowed; all-disallowed-actions: recover(4).

When sufficient cluster storage members are available to satisfy the specified recover quorum policy, the following message is emitted:
<Warning> (thread=DistributedCache:DistributedCachePersistence, member=1): All actions allowed. At this point recovery or persisted partitions from the active persistence store can commence.

Dynamic Active Persistence Recovery Quorum

A dynamic quorum is an enhanced quorum which does not require a predetermined threshold but instead defines a threshold based upon the ecosystem and ensures this adaptive threshold is retained across restarts of the distributed system. A dynamic quorum is self-learned based on the life of the system.

The self-learned threshold is itself stored in a "global partition" in the distributed cache of the distributed data grid. In an embodiment the global partition is a single partition in the distributed data grid for example "partition 0" 162 of FIG. 1. The metadata for a dynamic quorum is stored in a single partition and is as accessible as that partition. Thus if accessibility of that partition is required then the metadata will be available also.

In alternative embodiments the implementation can support multiple global partitions. Having multiple global partitions will allow the loss of some partitions but maintain these learned thresholds. Additionally, using more than a single global incurs extra overhead in maintaining the metadata, but practically should be unobservable.

In particular, the dynamic active persistence recovery quorum is a self-learned threshold used to ensure that recovery of data from an active persistence store only commences when sufficient storage members are present to recover the dataset. Rather than using a fixed threshold, the dynamic recover quorum is self-learned based on the life of the system.

As described above, the metadata required for the operation of dynamic active persistence recovery quorum is stored within 'global' persistent store as extra metadata that can be retrieved during recovery operations and stored after the members of a clusters has stabilized. In an embodiment the 'global partition' is a single partition in the distributed data grid for example "partition 0" 162 of FIG. 1. The configuration metadata includes for example the number of cluster members in the cluster and the number of cluster members on each host in the cluster. Because cluster members are started and stopped when necessary to provide capacity for the information to be stored in the distributed data grid and host nodes of distributed data grid, the cluster membership information is essentially a proxy for the resources in use by the distributed data grid. Accordingly this information can also be used to determine the resources required for graceful startup of the distributed data grid after a shutdown. It is important to determine the resource requirement because, for example, each cluster member is limited as to maximum supported cache size. Thus trying to recover the all partitions of a distributed cache before sufficient storage members are available to fit the partitions will result in a failure.

The dynamic active persistence recovery quorum is used with active persistence as described above and automatically configures the persistence recovery quorum based on a predefined algorithm. The dynamic recovery quorum policy is the default quorum policy for active persistence mode and does not need to be explicitly enabled. The policy is automatically used if either the <recover-quorum> value is not specified or if the value is set to 0. Alternatively, the use of the dynamic recovery quorum policy can be explicitly enable using a distributed scheme such as shown below:

```
<distributed-scheme>
    <scheme-name>distributed</scheme-name>
    <service-name>Service1</service-name>
    <backing-map-scheme>
        <local-scheme/>
    </backing-map-scheme>
    <partitioned-quorum-policy-scheme>
        <recover-quorum>0</recover-quorum>
    </partitioned-quorum-policy-scheme>
    <autostart>true</autostart>
</distributed-scheme>
```

The dynamic active persistence recovery quorum policy works by recording cluster membership information each time a member joins the cluster and partition distribution stabilizes. Membership is recorded if the service is not suspended and all other partitioned cache actions (such as read, write, restore, and distribute) are allowed by the policy. JMX notifications are sent to subscribers of the PersistenceCoordinatorMBean MBean every time the cluster membership changes. Accordingly all subscribers of the PersistenceCoordinatorMBean are notified of changes in cluster membership. Cluster membership changes are recorded as metadata in the global partition. In an embodiment the 'global partition(s)' is a single partition in the distributed data grid for example "partition 0" 162 of FIG. 1.

Figure 3A:
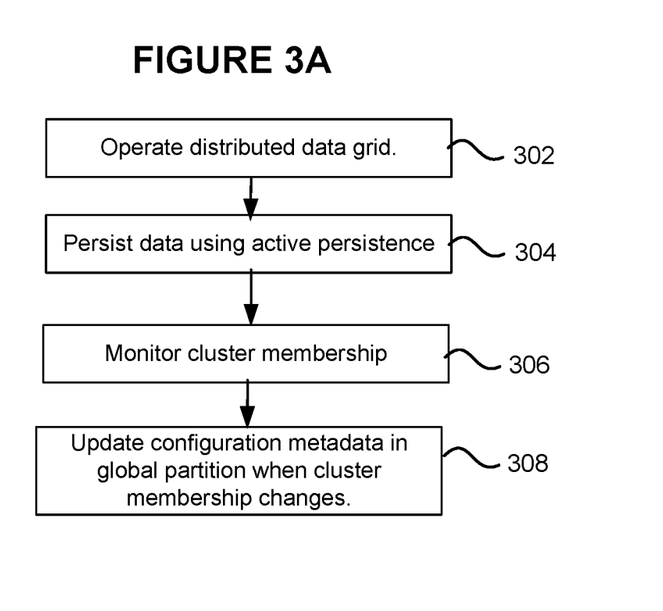
FIGS. 3A and 3B illustrate a recovery method using the dynamic active recovery quorum, in accordance with an embodiment of the invention.

As shown in FIG. 3A during operation of the distributed data grid 302, active persistence operates to persist data on each mutation to the configured persistence store. 304. Additionally cluster membership is monitored 306 and the metadata in the global configuration stored in the global partition 162 is updated as membership changes. For example, the metadata include information about the number of storage enable members in the cluster and the number of storage enabled members on each hots node of the cluster. Accordingly, normal operation of the distributed data grid results in persisting mutated data to the persistence store and storing configuration metadata used for calculation of the dynamic recovery quorum in the global partition 162. Note that the global partition, like other partitions, is also persisted in the persistence store.

Recovery Using Dynamic Active Persistence Recovery Quorum

After a catastrophic failure or after a cluster restart due to planned maintenance the persisted data can be recovered from the local disk or shared disk and used to populate the partitions in the cluster without loss of data. Distributed data grid 100 utilizes a dynamic active persistence recovery quorum function which determines the number of cluster storage members that must be available before recovery starts. The use of the dynamic active persistence recovery quorum allows time for a cluster storage members of a cluster to start and ensures that partitions can be recovered gracefully without overloading too few storage members.

The dynamic active persistence recovery quorum function automatically configures the recovery quorum based on a predefined algorithm and data collected about cluster membership during cluster operation prior to the catastrophic failure or shut down for planned maintenance. In general terms the conditions of the dynamic active recovery quorum are designed to ensure that all persisted partitions are available to recover and also that there are sufficient storage members available to recover the persisted partitions (without exceeding the maximum memory of the members.

During recovery scenarios, a service only recovers data if the following conditions are satisfied:
1. the persistent image of all partitions is accessible by the cluster members;
2. the number of storage-enabled nodes is at least ⅔ of the last recorded cluster membership; and
3. if the persistent data is being stored to a local disk (not shared and visible by all hosts), then there should be at least ⅔ of the number of members for each host as there was when the last membership was recorded.

The first condition ensures all persisted partitions are available for recovery. The second condition ensures that the number of nodes (storage members) in the cluster is sufficient to recover all the persisted partitions in the cluster (i.e. the number of nodes is a sufficient resource for recovering all the partitions). The third condition ensures that are sufficient nodes (storage members) on each host to recover the persisted partitions that must be recovered to that host (i.e. the number of nodes on each host is a sufficient resource for recovering all the partitions that must be recovered on that host).

The parameters of the dynamic active persistence recovery quorum algorithm can be overridden by using a custom quorum policy class that extends the PartitionedCacheQuorumPolicy class. For examples, the hard-coded ⅔ ratio in the above algorithm can be modified by overriding the PartitionedCacheQuorumPolicy.calculateMinThreshold method for example to ¾ or other ratio.

During recovery, the cache service blocks any client side requests if any of the conditions are not satisfied. However, if an administrator determines that the full recovery is impossible due to missing partitions or that starting the number of servers that is expected by the quorum is unnecessary, then the recovery can be forced by invoking the forceRecovery operation on the PersistenceCoordinatorMBean MBean.

During recovery, the recovery coordinator 160 can implement an ownership protocol in the distributed data grid. The ownership protocol is a light-weight data structure that contains a partition ownership information. The ownership protocol can provide an array of member ids representing the partition ownership and provides visibility not only of in-memory partitions but also persisted partitions. In response to the ownership protocol a cluster member having ownership of the global partition can respond to the recovery coordinator 160 with the global configuration metadata stored in the global partition. If the global partition is not yet available recovery cannot commence. The recovery coordinator 160 thus receives the pre-shutdown metadata.

Additionally, the recovery coordinator can utilize the ownership protocol to determine which hosts are available and which nodes are available on which hosts as the hosts and nodes are initiated. The recovery coordinator can then utilize the predefined algorithm and the pre-shutdown data to determine whether sufficient resources are available to commence automatic recovery of the persisted data to the caches of the initiated storage members. If data has not been recovered after cluster startup, the following log message is emitted (each time a new service member starts up) to indicate that the quorum has not been satisfied: <Warning> (thread=DistributedCache:DistributedCachePersistence, member=1): Action recover disallowed; all-disallowed-actions: recover(4). When sufficient cluster storage members are available to satisfy the specified recover quorum policy, the following message is emitted: <Warning> (thread=DistributedCache:DistributedCachePersistence, member=1): All actions allowed. At this point recovery or persisted partitions can commence. Use of the dynamic recovery quorum thus allows time for a cluster to start and initiate cluster members, and ensures that partitions can be recovered gracefully without overloading too few storage members.

Figure 3B:
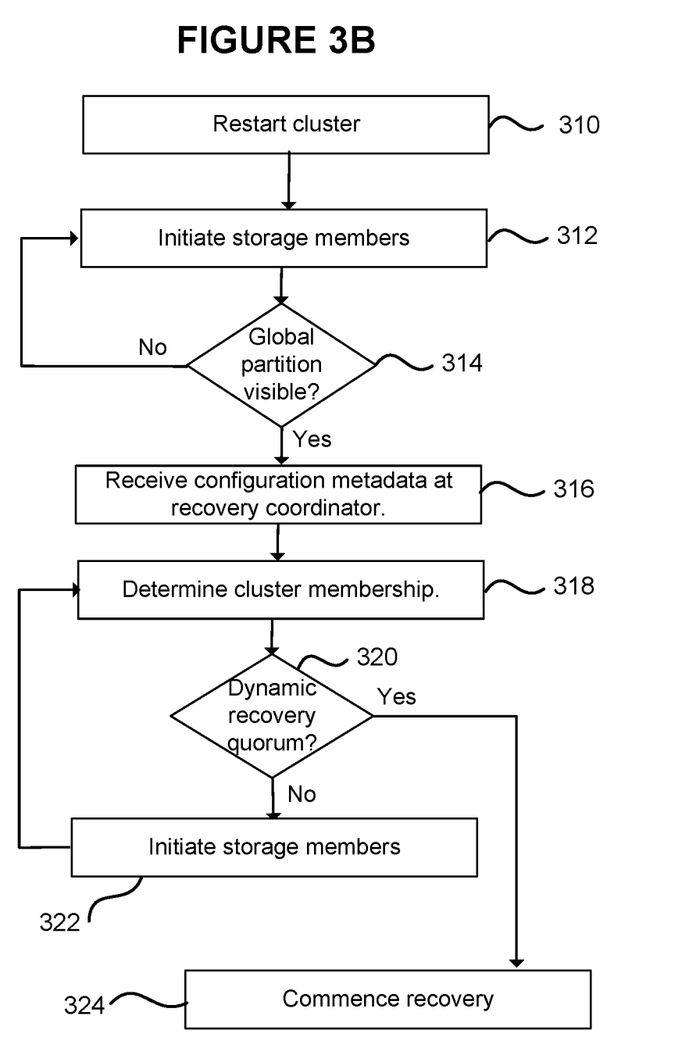

FIG. 3B, shows a method of operate a distributed data grid to perform automatic recovery using the dynamic active persistence recovery quorum. The cluster restarts at step 310. At step 312 one or more storage members are initiated. At step 314, the ownership protocol is used to determine whether the global partition is visible to the initiated storage members. If not, the method continues with step 312 with initiation or more storage members. If the global partition is visible at step 314, the recovery coordinator retrieves the global configuration metadata from the global partition at step 316. At step 318, the recovery coordinator uses the ownership protocol to determine cluster membership and partition count. At step 320, the recovery coordinator uses the dynamic active persistence recovery quorum algorithm and the retrieved global configuration metadata to determine whether the current cluster membership and partition count satisfies the values calculated using the global configuration metadata retrieved from the global partition. If not, the method continues with step 322 with initiation or more storage members. When the dynamic active persistence recovery quorum policy is satisfied the method can proceed to step 324 and commence recovery of the persisted data to the initiated members of the cluster.

In general terms, use of the dynamic active persistence recovery quorum makes sure that all partitions are available. Then checks that there are enough storage members available to store all the partitions. Then checks that (if the persisted partitions are stored locally) that there are enough storage members to store the partitions requiring local access. This ensures that when recovery is commenced that the storage members will not exceed their individual resource capacities and crash during recovery.

While various embodiments of the present invention have been described above, it should be understood that they have been presented by way of example, and not limitation. It will be apparent to persons skilled in the relevant art that various changes in form and detail can be made therein without departing from the spirit and scope of the invention.

Many features of the present invention can be performed in, using, or with the assistance of hardware, software, firmware, or combinations thereof. The present invention may be conveniently implemented using one or more conventional general purpose or specialized digital computer, computing device, machine, or microprocessor, including one or more processors, memory and/or computer readable storage media programmed according to the teachings of the present disclosure. Features of the invention may also be implemented in hardware using, for example, hardware components such as application specific integrated circuits (ASICs) and programmable logic device. Implementation of the hardware state machine so as to perform the functions described herein will be apparent to persons skilled in the relevant art.

Features of the present invention can be incorporated in software and/or firmware for controlling the hardware of a processing system, and for enabling a processing system to interact with other mechanisms utilizing the results of the present invention. Such software or firmware may include, but is not limited to, application code, device drivers, operating systems and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In embodiments, the storage medium or computer readable medium can be non-transitory.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting automated recovery of persisted data in a distributed data grid, the method comprising:
   actively persisting persisted data during operation of the distributed data grid;
   storing cluster membership data in a global partition of the distributed data grid wherein said cluster membership data consists essentially of a current number of storage-enabled members in the cluster and a current number of storage-enabled members on each host node of the cluster;
   updating the stored cluster membership data in response to changes in the current number of storage-enabled members in the cluster and the current number of storage-enable members on each host node of the cluster;
   providing a recovery coordinator service wherein, during a recovery operation, the recovery coordinator service operates to,
      retrieve the cluster membership data from the global partition,
      calculate a dynamic recovery quorum threshold by applying an algorithm to the retrieved cluster membership data,
      monitor current cluster membership, and
      defer recovery of the persisted data until the dynamic recovery quorum threshold is satisfied.

2. The method of claim 1, wherein the recovery coordinator service operates to calculate a dynamic recovery quorum threshold based on the retrieved cluster membership data by ensuring availability of all persisted data and current cluster membership sufficient for recovering all persisted data.

3. The method of claim 1, wherein the recovery quorum threshold requires availability of all persisted data and current cluster membership comprises a number of storage-enabled members which is at least ⅔ of the current number of storage-enabled members stored in the cluster membership data retrieved from the global partition.

4. The method of claim 1, wherein the recovery quorum threshold requires availability of all persisted data and current cluster membership comprises a number of storage-enabled members which is at least ⅔ of the current number of storage-enabled members stored in the cluster membership data from the global partition and a number of storage-enabled members per host which is at least ⅔ of the current number of storage-enabled members per host stored in the cluster membership data retrieved from the global partition.

5. The method of claim 1, comprising:
   restarting the distributed data grid;
   initiating cluster members of the distributed data grid;
   initiating a recovery coordinator service; and
   attempting to retrieve the cluster membership data from the global partition.

6. The method of claim 5, comprising:
   retrieving, with the recovery coordinator service, the cluster membership data from the global partition;
   calculating a dynamic recovery quorum threshold based on the retrieved cluster membership data;
   monitoring, with the recovery coordinator service, the current cluster membership; and
   deferring recovery of the persisted data until the dynamic recovery quorum threshold is satisfied.

7. The method of claim 5, comprising:
retrieving, with the recovery coordinator service, the cluster membership data from the global partition;
calculating a dynamic recovery quorum threshold based on the retrieved cluster membership data;
monitoring, with the recovery coordinator service, the current cluster membership; and
initiating recovery of the persisted data when the dynamic recovery quorum threshold is satisfied.

8. The method of claim 5, comprising:
retrieving, with the recovery coordinator service, the cluster membership data from the global partition;
calculating a dynamic recovery quorum threshold based on the retrieved cluster membership data wherein the dynamic recovery quorum threshold requires availability of all persisted data and current cluster membership sufficient for recovering all persisted data;
monitoring, with the recovery coordinator service, the current cluster membership; and
deferring recovery of the persisted data until the current cluster membership satisfies the dynamic recovery quorum threshold.

9. The method of claim 5, comprising:
retrieving, with the recovery coordinator service, the cluster membership data from the global partition;
calculating a dynamic recovery quorum threshold based on the retrieved cluster membership data wherein the dynamic recovery quorum threshold requires availability of all persisted data and current cluster membership comprises a number of storage-enabled members which is at least ⅔ of the current number of storage-enabled members stored in the cluster membership data retrieved from the global partition;
monitoring, with the recovery coordinator service, the current cluster membership; and
deferring recovery of the persisted data until the current cluster membership satisfies the dynamic recovery quorum threshold.

10. The method of claim 5, comprising:
retrieving, with the recovery coordinator service, the cluster membership data from the global partition;
calculating a dynamic recovery quorum threshold based on the retrieved cluster membership data wherein the dynamic recovery quorum threshold requires availability of all persisted data and current cluster membership comprises a number of storage-enabled members which is at least ⅔ of the current number of storage-enabled members stored in the cluster membership data from the global partition and a number of storage-enabled members per host which is at least ⅔ of the current number of storage-enabled members per host stored in the cluster membership data retrieved from the global partition;
monitoring, with the recovery coordinator service, the current cluster membership; and
deferring recovery of the persisted data until the current cluster membership satisfies the dynamic recovery quorum threshold.

11. A system for supporting automated recovery of persisted data comprising:
a plurality of computer systems each comprising a microprocessor and memory;
a network connecting the plurality of computer systems;
a distributed data grid operating on the plurality of computer systems wherein the distributed data grid is configured to perform steps comprising,
actively persisting persisted data during operation of the distributed data grid,
storing cluster membership data in a global partition of the distributed data grid, wherein said cluster membership data consists essentially of a current number of storage-enabled members in the cluster and a current number of storage-enabled members on each host node of the cluster,
updating the stored cluster membership data in response to changes in the current number of storage-enabled members in the cluster and the current number of storage-enable members on each host node of the cluster,
providing a recovery coordinator service, and
wherein, during a recovery operation, the recovery coordinator service operates to, retrieve the cluster membership data from the global partition, calculate a dynamic recovery quorum threshold based by applying an algorithm to the retrieved cluster membership data, monitor current cluster membership, and defer recovery of the persisted data until the dynamic recovery quorum threshold is satisfied.

12. The system of claim 11, wherein the recovery coordinator service operates to calculate a dynamic recovery quorum threshold based on the retrieved cluster membership data by ensuring availability of all persisted data and current cluster membership sufficient for recovering all persisted data.

13. The system of claim 11, wherein the recovery quorum threshold requires availability of all persisted data and current cluster membership comprises a number of storage-enabled members which is at least ⅔ of the current number of storage-enabled members stored in the cluster membership data retrieved from the global partition.

14. The system of claim 11, wherein the recovery quorum threshold requires availability of all persisted data and current cluster membership comprises a number of storage-enabled members which is at least ⅔ of the current number of storage-enabled members stored in the cluster membership data from the global partition and a number of storage-enabled members per host which is at least ⅔ of the current number of storage-enabled members per host stored in the cluster membership data retrieved from the global partition.

15. The system of claim 11, wherein the distributed data grid is configured to perform further steps comprising:
restarting the distributed data grid;
initiating cluster members of the distributed data grid;
initiating a recovery coordinator service; and
attempting to retrieve the cluster membership data from the global partition.

16. The system of claim 15, wherein the distributed data grid is configured to perform further steps comprising:
retrieving, with the recovery coordinator service, the cluster membership data from the global partition;
calculating a dynamic recovery quorum threshold based on the retrieved cluster membership data;
monitoring, with the recovery coordinator service, the current cluster membership; and
deferring recovery of the persisted data until the dynamic recovery quorum threshold is satisfied.

17. The system of claim 15, wherein the distributed data grid is configured to perform further steps comprising:
retrieving, with the recovery coordinator service, the cluster membership data from the global partition;
calculating a dynamic recovery quorum threshold based on the retrieved cluster membership data;

monitoring, with the recovery coordinator service, the current cluster membership; and initiating recovery of the persisted data when the dynamic recovery quorum threshold is satisfied.

18. The system of claim 15, wherein the distributed data grid is configured to perform further steps comprising:

retrieving, with the recovery coordinator service, the cluster membership data from the global partition;

calculating a dynamic recovery quorum threshold based on the retrieved cluster membership data wherein the dynamic recovery quorum threshold requires availability of all persisted data and current cluster membership sufficient for recovering all persisted data;

monitoring, with the recovery coordinator service, the current cluster membership; and deferring recovery of the persisted data until the current cluster membership satisfies the dynamic recovery quorum threshold.

19. The system of claim 15, wherein the distributed data grid is configured to perform further steps comprising:

retrieving, with the recovery coordinator service, the cluster membership data from the global partition;

calculating a dynamic recovery quorum threshold based on the retrieved cluster membership data wherein the dynamic recovery quorum threshold requires availability of all persisted data and current cluster membership comprises a number of storage-enabled members which is at least ⅔ of the current number of storage-enabled members stored in the cluster membership data retrieved from the global partition;

monitoring, with the recovery coordinator service, the current cluster membership; and deferring recovery of the persisted data until the current cluster membership satisfies the dynamic recovery quorum threshold.

20. A non-transitory computer readable storage medium including instructions stored thereon for supporting automated recovery of persisted data in a distributed data grid, which instructions, when executed, cause the distributed date grid to perform steps comprising:

actively persisting persisted data during operation of the distributed data grid, storing cluster membership data in a global partition of the distributed data grid, wherein said cluster membership data consists essentially of a current number of storage-enabled members in the cluster and a current number of storage-enabled members on each host node of the cluster, updating the stored cluster membership data in response to changes in the current number of storage-enabled members in the cluster and the current number of storage-enable members on each host node of the cluster, providing a recovery coordinator service, and wherein, during a recovery operation, the recovery coordinator service operates to, retrieve the cluster membership data from the global partition, calculate a dynamic recovery quorum threshold based by applying an algorithm to the retrieved cluster membership data, monitor current cluster membership, and defer recovery of the persisted data until the dynamic recovery quorum threshold is satisfied.

* * * * *